United States Patent
Wang et al.

(10) Patent No.: US 12,165,432 B2
(45) Date of Patent: Dec. 10, 2024

(54) SECURE FACE IMAGE TRANSMISSION METHOD, APPARATUSES, AND ELECTRONIC DEVICE

(71) Applicant: Tencent Technology (Shenzhen) Company Limited, Shenzhen (CN)

(72) Inventors: Shaoming Wang, Shenzhen (CN); Zhijun Geng, Shenzhen (CN); Jun Zhou, Shenzhen (CN); Runzeng Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 418 days.

(21) Appl. No.: 17/528,079

(22) Filed: Nov. 16, 2021

(65) Prior Publication Data
US 2022/0075998 A1 Mar. 10, 2022

Related U.S. Application Data

(63) Continuation of application No. PCT/CN2020/120316, filed on Oct. 12, 2020.

(30) Foreign Application Priority Data

Dec. 16, 2019 (CN) .......................... 201911300268.6

(51) Int. Cl.
*G06V 40/16* (2022.01)
*G06T 1/60* (2006.01)
(Continued)

(52) U.S. Cl.
CPC .............. *G06V 40/172* (2022.01); *G06T 1/60* (2013.01); *G06V 10/94* (2022.01); *H04L 63/0861* (2013.01); *H04N 23/611* (2023.01)

(58) Field of Classification Search
None
See application file for complete search history.

(56) References Cited

U.S. PATENT DOCUMENTS 6,212,285 B1 * 4/2001 Bender .............. H04N 1/32251
380/54
6,782,116 B1 * 8/2004 Zhao .................... G07D 7/0032
713/176
(Continued)

FOREIGN PATENT DOCUMENTS

CN 101777212 A 7/2010
CN 106485201 A 3/2017
(Continued)

OTHER PUBLICATIONS

Haddada, Lamia Rzouga, Bernadette Dorizzi, and Najoua Essoukri Ben Amara. "A combined watermarking approach for securing biometric data." Signal Processing: Image Communication 55 (2017): 23-31. (Year: 2017).*

(Continued)

*Primary Examiner* — Michelle M Entezari Hausmann
(74) *Attorney, Agent, or Firm* — Morgan, Lewis & Bockius LLP

(57) ABSTRACT

This application discloses a secure face image transmission method performed by an electronic device. In this application, when a camera component of the electronic device acquires any face image, face image information can be read from a buffer. The face image information is used for indicating a quantity of all face images historically acquired by the camera component. Identification information is embedded in the face image to obtain the face image carrying the identification information. The identification information is used for indicating the face image information but not perceivable by a human being. The face image carrying the identification information is transmitted to a (Continued)

remote server for authenticating the face image using the identification information. Therefore, the security of the face image acquired by the camera component is improved, and the security of the face image transmission process is effectively ensured.

17 Claims, 6 Drawing Sheets

(51) Int. Cl.
*G06V 10/94* (2022.01)
*H04L 9/40* (2022.01)
*H04N 23/611* (2023.01)

(56) References Cited

U.S. PATENT DOCUMENTS

| | | | | |
|---|---|---|---|---|
| 7,315,621 | B2* | 1/2008 | Noridomi | G06T 1/0085 380/54 |
| 7,663,670 | B1* | 2/2010 | Orboubadian | H04N 25/68 348/231.2 |
| 7,756,892 | B2* | 7/2010 | Levy | H04N 21/8358 713/176 |
| 8,068,636 | B2* | 11/2011 | Rodriguez | G06T 1/0028 382/100 |
| 8,817,275 | B2* | 8/2014 | Fukuoka | H04N 1/32651 358/1.14 |
| 10,778,886 | B2* | 9/2020 | Fukushima | G06V 40/172 |
| 10,991,064 | B1* | 4/2021 | Belovay | G06Q 30/0641 |
| 11,176,373 | B1* | 11/2021 | Mitura | G06F 16/583 |
| 2002/0052885 | A1* | 5/2002 | Levy | H04N 21/8405 |
| 2006/0126088 | A1* | 6/2006 | Inoue | H04N 1/32358 358/1.18 |
| 2006/0200672 | A1* | 9/2006 | Calhoon | G06F 21/16 713/176 |
| 2008/0162830 | A1* | 7/2008 | Marathe | G06F 12/023 711/E12.006 |
| 2009/0010570 | A1 | 1/2009 | Yamada et al. | |
| 2009/0080020 | A1* | 3/2009 | Kitagawa | H04N 9/8227 358/1.15 |
| 2014/0289568 | A1* | 9/2014 | Koyama | G06F 11/3055 714/39 |
| 2015/0003608 | A1* | 1/2015 | Ansari | H04N 7/147 380/201 |
| 2015/0172713 | A1* | 6/2015 | Komiya | H04N 19/573 375/240.15 |
| 2016/0261911 | A1 | 9/2016 | Soundararajan et al. | |
| 2018/0240212 | A1 | 8/2018 | Calhoon et al. | |
| 2018/0260617 | A1 | 9/2018 | Jones et al. | |
| 2019/0238954 | A1* | 8/2019 | Dawson | H04N 1/00177 |

FOREIGN PATENT DOCUMENTS

| | | |
|---|---|---|
| CN | 106803289 A | 6/2017 |
| CN | 106920111 A | 7/2017 |
| CN | 107679861 A | 2/2018 |
| CN | 108306886 A | 7/2018 |
| CN | 109145563 A | 1/2019 |
| CN | 111062323 A | 4/2020 |
| JP | 2001052143 A | 2/2001 |
| JP | 2001094755 A | 4/2001 |
| JP | 2007116506 A | 5/2007 |
| JP | WO 2019026196 | 4/2020 |

OTHER PUBLICATIONS

Neekhara P, Hussain S, Zhang X, Huang K, McAuley J, Koushanfar F. FaceSigns: semi-fragile neural watermarks for media authentication and countering deepfakes. arXiv preprint arXiv:2204.01960. Apr. 5, 2022. (Year: 2022).*

Cheddad A, Condell J, Curran K, Mc Kevitt P. Biometric inspired digital image steganography. In15th Annual IEEE International Conference and Workshop on the Engineering of Computer Based Systems (ecbs 2008) Mar. 31, 2008 (pp. 159-168). IEEE. (Year: 2008).*

Tencent Technology, ISR, PCT/CN2020/120316, Jan. 12, 2021, 2 pgs.

Tencent Technology, Extended European Search Report and Supplementary Search Report, EP20903189.7, Dec. 19, 2022, 12 pgs.

Himanshu Agarwal et al., "Watermarking Schemes to Secure the Face Database and Test Images in A Biometric System", 2013 IEEE International Conference on Signal and Image Processing Applications (ICSIPA), Oct. 10, 2013, 3 pgs., Retrieved from the Internet: https://www.researchgate.net/publication/261424153_Watermarking_schemes_to_secure_the_face_database_and_test_images_in_a_biometric_system.

Tejtasin Phiasai et al., "A Method for Watermarking on Facial Images", 2014 4th International Conference on Wireless Communications, Vehicular Technology, Information Theory and Aerospace and Electronic Systems (VITAE), IEEE, May 11, 2014, XP032665769, 3 pgs., Retrieved from the Internet: https://ieeexplore.ieee.org/abstract/document/6934486.

Tencent Technology, Japanese Office Action, JP Patent Application No. 2022-515017, May 16, 2023, 14 pgs.

Tencent Technology, WO, PCT/CN2020/120316, Jan. 12, 2021, 5 pgs.

Tencent Technology, IPRP, PCT/CN2020/120316, May 17, 2022, 6 pgs.

Tencent Technology, European Office Action, EP Patent Application No. 20903189.7, Feb. 6, 2024, 5 pgs.

* cited by examiner

SECURE FACE IMAGE TRANSMISSION METHOD, APPARATUSES, AND ELECTRONIC DEVICE

CROSS-REFERENCE TO RELATED APPLICATIONS

This application is a continuation application of PCT Patent Application No. PCT/CN2020/120316, entitled "FACIAL IMAGE TRANSMISSION METHOD, NUMERICAL VALUE TRANSFER METHOD AND APPARATUS. AND ELECTRONIC DEVICE" filed on Oct. 12, 2020, which claims priority to Chinese Patent Application No. 201911300268.6, filed with the State Intellectual Property Office of the People's Republic of China on Dec. 16, 2019, and entitled "FACE IMAGE TRANSMISSION METHOD, VALUE TRANSFER METHOD, APPARATUSES, AND ELECTRONIC DEVICE", all of which are incorporated herein by reference in their entirety.

FIELD OF THE TECHNOLOGY

This application relates to the field of network technologies, and in particular, to a secure face image transmission method, apparatuses, an electronic device, and a storage medium.

BACKGROUND OF THE DISCLOSURE

With the development of network technologies, a user can trigger an operation based on a terminal. For example, the terminal first verifies whether the user is the user himself/herself based on a face recognition technology, and then performs the operation after the verification is successful.

At present, after acquiring a face image of the user, a camera of the terminal directly transmits the face image (also referred to as raw data) to a processor of the terminal, the processor of the terminal uploads the face image to a server, the server performs face recognition on the face image to generate a recognition result, and the server transmits the recognition result to the terminal. When the recognition result is "yes", the subsequent operation is triggered. But this process may have security loopholes when the transmission of the face image is intercepted and manipulated by a malicious party, resulting an unintended operation.

SUMMARY

Embodiments of this application provide a secure face image transmission method, apparatuses, an electronic device, and a storage medium. The technical solutions are as follows:

According to an aspect, a face image transmission method is provided, applicable to a terminal, the method including:
reading face image information from a buffer when a camera component acquires any face image, the face image information being used for indicating a quantity of all face images historically acquired by the camera component;
embedding identification information in the face image to obtain the face image carrying the identification information, the identification information being used for indicating the face image information and the identification information in the face image not being perceivable by a human being; and
transmitting the face image carrying the identification information to a remote server for authenticating the face image using the identification information.

According to an aspect, an electronic device is provided, including one or more processors and one or more memories, the one or more memories storing at least one program code, the at least one program code being loaded and executed by the one or more processors to implement the aforementioned face image transmission method.

According to an aspect, a non-transitory computer-readable storage medium is provided, storing at least one program code, the at least one program code being loaded and executed by a processor of an electronic device to implement the operations performed in the face image transmission method.

The technical solutions provided in the embodiments of this application include at least the following beneficial effects:

When a camera component acquires any face image, face image information can be read from a buffer. The face image information is used for indicating a quantity of all face images historically acquired by the camera component. Identification information is embedded in the face image to obtain the face image carrying the identification information. The identification information is used for indicating the face image information. The face image carrying the identification information is transmitted. Therefore, the identification information can be directly embedded in the face image acquired by the camera component, improving the security of the face image acquired by the camera component. Even if a face image is leaked, when an attacker steals a historical face image to request related services, the verification cannot be successful due to the discrepancy in the identification information, thereby effectively ensuring the security of the face image transmission process.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art can still derive other drawings from these accompanying drawings without creative efforts.

DESCRIPTION OF EMBODIMENTS

To make the objectives, technical solutions, and advantages of this application clearer, the following further describes the implementations of this application in detail with reference to the accompanying drawings.

In the related art, due to the gradual diversification of current network attack methods, face images may be leaked during data transmission, and "replay attacks" may occur: After a terminal acquires a face image of an attacker, the attacker launches a network attack in the process of the terminal transmitting the image to a server and replaces the face image of the attacker with a valid face image that has been stolen, which causes funds of a user corresponding to the valid face image to be stolen. Therefore, the security of the face image transmission process is poor.

Figure 1:
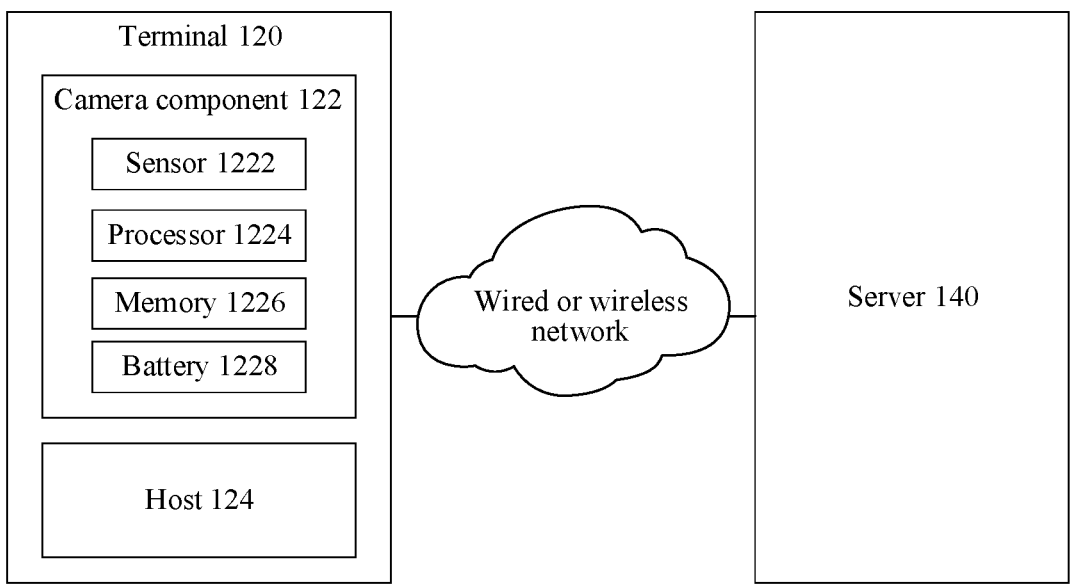
FIG. 1 is a schematic diagram of an implementation environment of a face image transmission method according to an embodiment of this application.

FIG. 1 is a schematic diagram of an implementation environment of a face image transmission method according to an embodiment of this application. Referring to FIG. 1, the implementation environment may include a terminal 120 and a server 140. Both the terminal 120 and the server 140 may be referred to as an electronic device.

The terminal 120 is configured for face image transmission. The terminal 120 may include a camera component 122 and a host 124. The camera component 122 is configured to acquire a face image, embed identification information in the acquired face image, and then transmit the face image carrying the identification information to the host 124. The host 124 may compress, encrypt, and encapsulate the face image carrying the identification information to obtain a data transmission message. The host 124 transmits the data transmission message to the server 140.

In some embodiments, the camera component 122 is a 3 Dimensions (3D) camera component. The 3D camera component may have functions such as face recognition, gesture recognition, human skeleton recognition, 3D measurement, environment perception, or 3D map reconstruction. Information about distance between each pixel in an acquired image and a camera can be detected by using the 3D camera component, so that whether a user corresponding to a currently acquired face image is a living body can be determined to prevent attackers from using other people's photos to perform identity verification to steal other people's funds for value transfer.

In some embodiments, the camera component 122 includes a sensor 1222, a processor 1224, a memory 1226, and a battery 1228. In some embodiments, the camera component 122 may further have a camera identification. The camera identification is used for uniquely identifying the camera component 122. For example, the camera identification is a serial number (SN) assigned to the camera component 122 when the camera component 122 leaves the factory, and the SN is the unique number of the camera component 122.

The sensor 1222 is configured to acquire face images. The sensor 1222 may be disposed inside the camera component 122. The sensor 1222 may be at least one of a color image sensor, a depth image sensor, or an infrared image sensor. Types of the sensor 1222 are not limited in the embodiments of this application. Correspondingly, a face image acquired by the sensor 1222 may also be at least one of a color image, a depth image, or an infrared image. Types of the face image are not limited in the embodiments of this application.

The processor 1224 may be configured to embed identification information in a face image acquired by the sensor 1222. For example, the processor 1224 is a digital signal processor (DSP). The DSP is a special microprocessor, which is a device that can process a large amount of information with digital signals. Certainly, the processor 1224 may alternatively be in the hardware form of a field programmable gate array (FPGA) or a programmable logic array (PLA). The hardware form of the processor 1224 is not limited in the embodiments of this application.

The memory 1226 is configured to store face image information, and the face image information is used for indicating a quantity of all face images historically acquired by the camera component 122. For example, the memory 1226 is a flash memory (FLASH), a magnetic disk storage device, or a high-speed random access memory (CACHE). Types of the memory 1226 are not limited in the embodiments of this application.

The battery 1228 is configured to supply power to components of the camera component 122. In this case, even if the host 124 of the terminal 120 is powered off, the battery 1228 inside the camera component 122 can still supply power to the memory 1226 to avoid the loss of face image information in the memory 1226 due to power off.

The terminal 120 and the server 140 may be connected by a wired or wireless network.

The server 140 may include at least one of one server, a plurality of servers, a cloud computing platform, and a virtualization center. The server 140 is configured to provide a backend service for an APP running on the terminal 120. The APP may provide a user with a value transfer service, so that the user can perform a value transfer operation based on the terminal 120. In some embodiments, the server 140 takes on primary computing work, and the terminal 120 takes on secondary computing work; alternatively, the server 140 takes on secondary computing work, and the terminal 120 takes on primary computing work; alternatively, collaborative computing is performed by using a distributed computing architecture between the server 140 and the terminal 120.

In some embodiments, the server 140 is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

In an exemplary scenario, the face data transmission process occurs in the process of value transfer based on face recognition. In this case, the terminal 120 is commonly referred to as a "facial recognition payment terminal". The facial recognition payment terminal refers to an electronic device that integrates a camera and can acquire a face image of a user and then make a payment. A first user may perform a trigger operation on a value transfer option on the terminal 120 to trigger the terminal 120 to invoke the camera component 122 to acquire a face data stream of the first user in real time. For any image frame (that is, face image) in the face data stream, the face image carrying identification information may be obtained based on the face image transmission method provided by the embodiments of this application, so that the terminal 120 may encapsulate the face image carrying the identification information, a camera identification, and value transfer information into a value transfer request, and transmit the value transfer request to the server 140. The server 140 performs identity verification on the first user based on the face image carrying the identification information and the camera identification. On the one hand, whether the face image is the latest image acquired by the camera component 122 can be verified based on the identification information, so as to prevent an attacker from stealing a historical face image of the first user for illegal payment. On the other hand, whether a face region in the face image is the first user can be verified through face recognition, so as to achieve double identity verification. When the double identity verification is successful, the server 140 may perform value transfer based on the value transfer information in the value transfer request. The value transfer information includes a first user identification, a second user identification, and a to-be-transferred value.

The first user and the second user are only distinguished names for users with different identities in a certain process of value transfer. In some value transfer processes, a certain user may be both a first user and a second user, that is, the user transfers a value from an account to another account both owned by himself/herself. Certainly, a certain user may be as a first user in a value transfer process and as a second user in another value transfer process.

Figure 2:
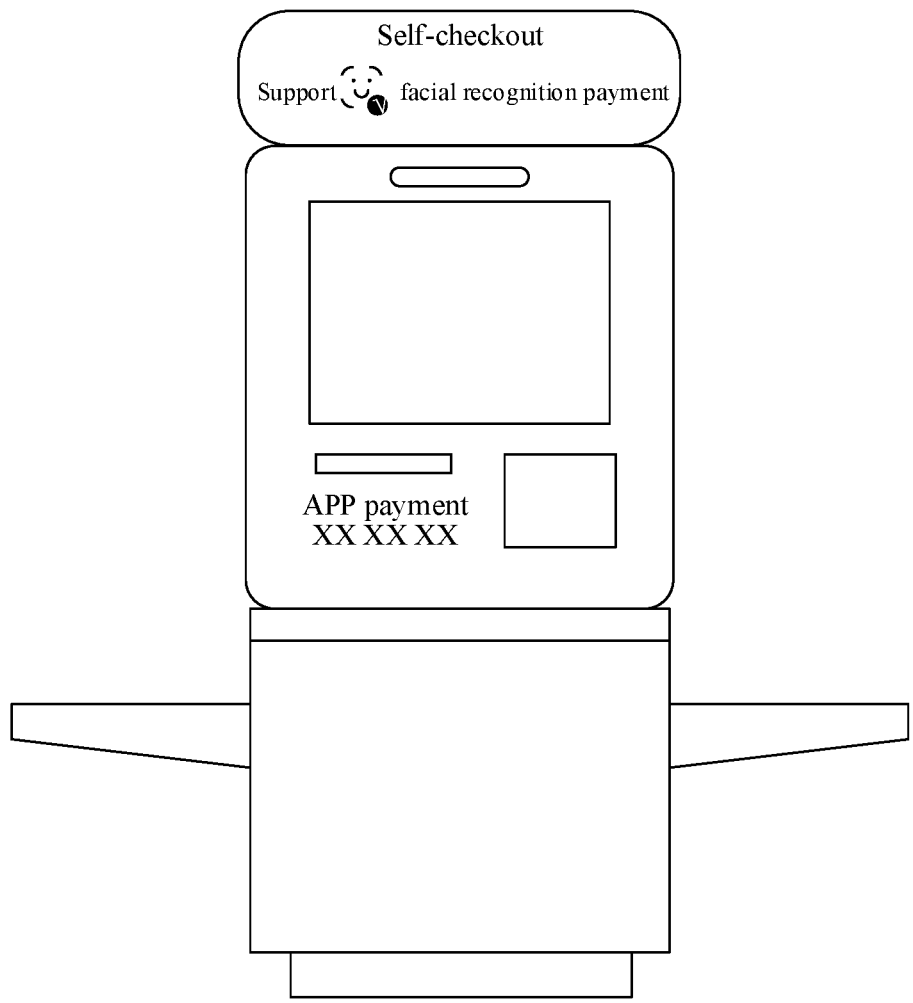
FIG. 2 is a schematic diagram of an appearance of a terminal according to an embodiment of this application.

FIG. 2 is a schematic diagram of an appearance of a terminal 120 according to an embodiment of this application. Referring to FIG. 2, the terminal 120 may have a display screen, and a user performs an interaction operation based on the display screen, thereby completing a value transfer operation based on face recognition. In some embodiments, a device type of the terminal 120 includes at least one of a smartphone, a tablet computer, an e-book reader, a Moving Picture Experts Group Audio Layer III (MP3) player, a Moving Picture Experts Group Audio Layer IV (MP4) player, a laptop computer, and a desktop computer.

In some embodiments, there may be more or fewer terminals 120. For example, there may be only one terminal 120, or there may be dozens of or hundreds of terminals 120 or more. The quantity and the device type of the terminal 120 are not limited in the embodiments of this application.

Figure 3:
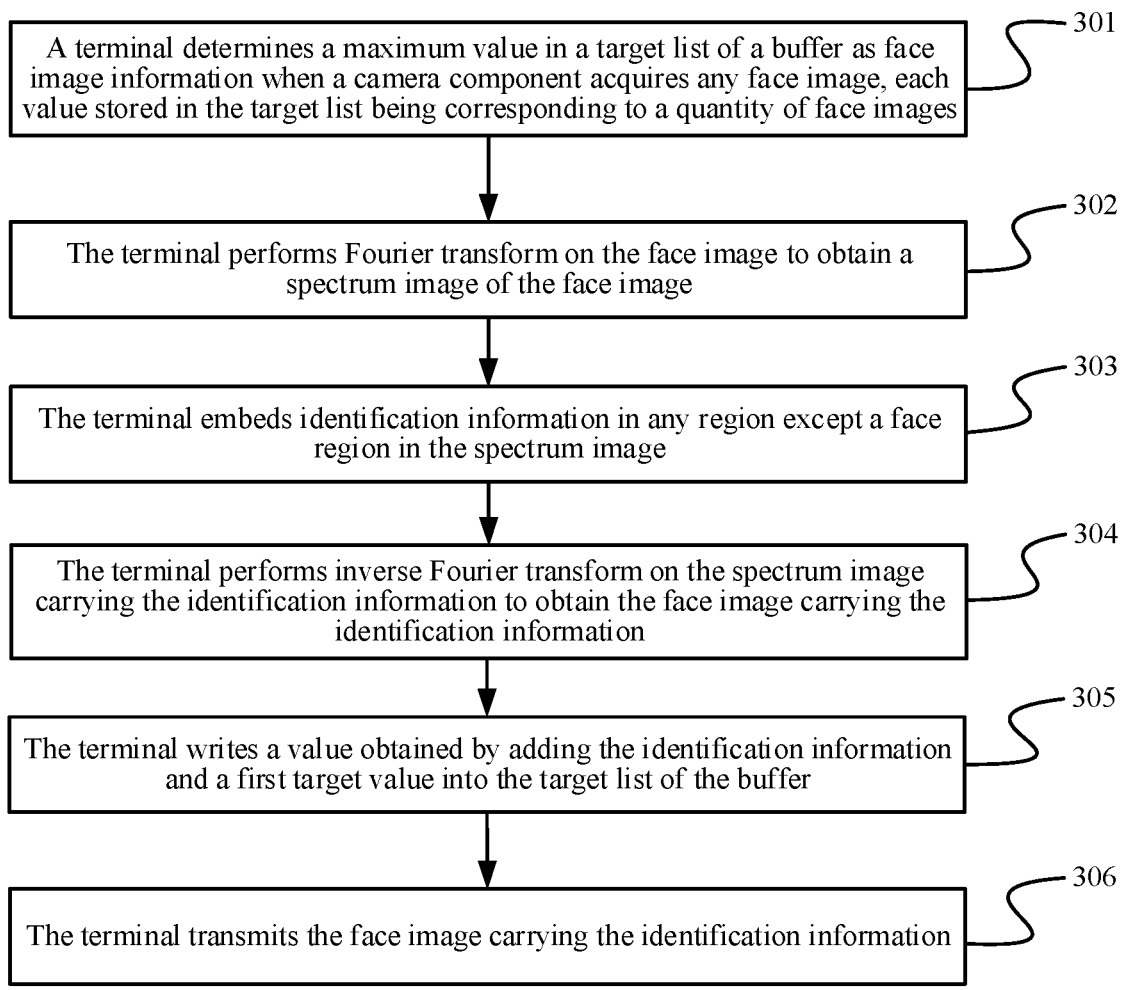
FIG. 3 is a flowchart of a secure face image transmission method according to an embodiment of this application.

FIG. 3 is a flowchart of a face image transmission method according to an embodiment of this application. Referring to FIG. 3, this embodiment may be applied to the terminal 120 in the foregoing implementation environment. The details are as follows:

301. A terminal determines a maximum value in a target list of a buffer as face image information when a camera component acquires any face image, each value stored in the target list being corresponding to a quantity of face images.

The terminal is configured to perform face image transmission. The terminal may include the camera component and a host. The camera component is configured to acquire a face image and embed identification information in the acquired face image. The camera component transmits the face image carrying the identification information to the host. The host transmits the face image carrying the identification information to a server. In some embodiments, the camera component is a 3D camera component, so that the camera component can detect information about distance between each pixel in an acquired image and a camera to determine whether a user corresponding to a currently acquired face image is a living body to prevent attackers from using other people's photos to perform identity verification to steal other people's funds for value transfer.

In some embodiments, the camera component includes a sensor, a processor, a memory, and a battery. The memory of the camera component may store a target list. The target list includes a plurality of values, and each value is corresponding to a quantity of face images. When the quantity of face images acquired by the camera component, the processor of the camera component may write a new value into the target list and delete an existing value with the earliest timestamp in the target list, to achieve real-time update of the target list.

In some embodiments, when a quantity of face images is [500, 501, 502, . . . ], each value in a target list may be equal to the quantity of face images, and the target list is [500, 501, 502, . . . ]. Alternatively, each value in a target list may be N times (N>1) the quantity of face images, and the target list is [500N, 501N, 502N, . . . ]. Certainly, each value in a target list may alternatively be a value obtained by exponential transformation or logarithmic transformation of the quantity of face images. A transformation manner between the quantity of face images and each value stored in the target list is not limited in this embodiment of this application.

In the foregoing case, a terminal operating system may deliver an acquisition instruction to the camera component, and the camera component acquires a face image through the sensor of the camera component in response to the acquisition instruction. The sensor may acquire a face data stream of a user in real time. For any face image (that is, any image frame) in the face data stream, the sensor transmits the acquired face image to the processor of the camera component. The processor determines a target list from a buffer, queries a maximum value in the target list, and determines the maximum value as face image information.

In some embodiments, different types of sensors may acquire different types of face images. For example, the face image acquired by an infrared image sensor is an infrared image, the face image acquired by a depth image sensor is a depth image, and the face image acquired by a color image sensor is a color image. Types of the sensor and the face image are not limited in the embodiments of this application.

In the foregoing process, because the camera component maintains a target list with a maximum value updated as a quantity of acquired face images increases through the internal processor and memory, when the quantity of acquired face images by the camera component is larger, the maximum value in the target list is larger, resulting in a larger value of the face image information, so that the camera component implements counting of a quantity of all acquired face images based on the face image information.

In the step 301, the terminal reads the face image information from the buffer, and the face image information is used for indicating a quantity of all face images historically acquired by the camera component. In some embodiments, the terminal may not store the face image information in the form of a target list, but instead store the face image information in data formats such as stacks, arrays, and tuples. The data formats of the face image information in the buffer are not limited in this embodiment of this application.

302. The terminal performs Fourier transform on the face image to obtain a spectrum image of the face image.

In the foregoing process, the terminal may perform discrete cosine transform (DCT) on the face image to obtain the spectrum image of the face image. The DCT is a discrete Fourier transform method, which is mainly used to compress data or images to convert signals in a spatial domain to a frequency domain, and has good decorrelation performance.

303. The terminal embeds identification information in any region except a face region in the spectrum image.

The identification information is used for indicating the face image information. In some embodiments, the identification information may be a value obtained by adding the face image information and a third target value. The third target value may be any value greater than or equal to 0. In some embodiments, the identification information may alternatively be a value obtained by multiplying the face image information by a fourth target value. The fourth target value may be any value greater than or equal to 1. The fourth target value and the third target value may be the same or may be different. In some embodiments, the identification information may alternatively be a value obtained after one-way encryption of the face image information. A transformation manner between the face image information and the identification information is not limited in this embodiment of this application.

Since the face region is usually located in a center of the face image, any region except the face region may be at least one of an upper left corner, a lower left corner, an upper right corner, or a lower right corner of the face image. For example, the any region is determined as the upper left corner of the face image. A location of an embedding region of the identification information is not limited in this embodiment of this application.

When the third target value is 0, the identification information is the same as the face image information, and the terminal may embed the face image information in any region except the face region in the spectrum image. When the third target value is greater than 0, the terminal may add the face image information determined in the step 301 and the third target value to obtain the identification information, and then embed the identification information in any region except the face region in the spectrum image.

In the foregoing process, the identification information is embedded in any region except the face region in the face image, which can prevent pixel information of the face region in the face image from being destroyed to avoid the problem of inability to perform face recognition due to occlusion of the face region, and can optimize the processing logic of the face image transmission process.

304. The terminal performs inverse Fourier transform on the spectrum image carrying the identification information to obtain the face image carrying the identification information.

In the foregoing process, after embedding the identification information in the spectrum image, the terminal may perform inverse DCT transform on the spectrum image carrying the identification information, and convert the spectrum image carrying the identification information from the frequency domain back to the spatial domain, so that the user cannot perceive the identification information embedded in the face image can be ensured. The identification information that the user cannot perceive (e.g., invisible or inaudible) may be commonly referred to as "blind watermark" or "digital watermark". The user can neither see nor hear the blind watermark, but when the terminal transmits the face image carrying the blind watermark to the server, the server can parse out the blind watermark carried in the face image.

In the foregoing steps 302 to 304, the terminal may embed the identification information in any region except the face region in the face image. Certainly, the terminal may alternatively embed the identification information in the face region in the face image. Whether the embedding region of the identification information is the face region is not limited in this embodiment of this application.

In the foregoing process, the terminal embeds the identification information in the face image to obtain the face image carrying the identification information. The identification information is used for indicating the face image information. Security precaution can be carried out in a manner of embedding a blind watermark for a face data source (that is, any face image) acquired by the camera component. In this case, even if a network attack occurs when the face image is transmitted between the camera component and the host or between the host and the server, when an attacker replaces the stolen face image acquired this time with a historical face image of the stolen user, the server can recognize in time that the identification information of the historical face image has expired and the historical face image is not the face image acquired in real time at the latest time, so that the verification of the face image is determined to be failed, greatly improving the security of various services of the verification based on the face image.

305. The terminal writes a value obtained by adding the identification information and a first target value into the target list of the buffer.

The first target value is a value greater than or equal to 0. For example, the first target value is 1.

In the foregoing process, after embedding the identification information in the face image through the processor of the camera component, the terminal may further write the value obtained by adding the identification information and the first target value into the target list. Since the face image information is an original maximum value in the target list, the identification information is greater than or equal to the face image information, and the value written this time is greater than or equal to the identification information, then the value written this time is greater than or equal to the original maximum value in the target list. Therefore, the maximum value in the target list can be updated to maintain the maximum value in the target list stored in the memory of the camera component to increase as the quantity of acquired face images increases.

In an exemplary scenario, the sensor of the camera component is SENSOR, the processor of the camera component is DSP, the memory of the camera component is FLASH, and each value in the target list stored in the FLASH is FLASH is exactly the quantity of face images. In this case, it is considered that the FLASH counts the quantity of acquired face images in real time for updating. The DSP obtains the face data stream from the SENSOR, and reads a maximum quantity of face images (that is, the current latest count) from the target list stored in the FLASH for each frame of face image (that is, any image frame in the face data stream). Assuming that a third target value is 1, the DSP determines a value obtained by adding one to the maximum quantity of face images as identification information, and embeds the identification information into the frame of face image. Assuming that a first target value is 0, the DSP directly writes the identification information into the target list.

For example, the current latest count in the target list of the FLASH is 1000, indicating that the quantity of all face images historically acquired by the camera component is 1000. When the SENSOR acquires the 1001th face image, the DSP reads the current latest count 1000 from the target list of the FLASH and determines that the identification information is 1001. The identification information 1001 is embedded in the 1001th face image in the form of a blind watermark, and the identification information 1001 is then written back to the target list, so that the DSP can read 1001 when reading a current latest count next time, ensuring that the DSP can read an increasing count every time from the FLASH.

In an exemplary scenario, assuming that each value in the target list stored in the FLASH is exactly a value obtained by adding one to the quantity of face images, after the DSP obtains the face data stream from the FLASH, the current latest count read by the DSP from the target list stored in the FLASH is a value obtained by adding one to a maximum quantity of face images for each frame of face image. Assuming that a third target value is 0, the DSP determines a value obtained by adding one to the maximum quantity of face images as identification information, and embeds the identification information into the frame of face image. Assuming that a first target value is 1, the DSP writes a value obtained by adding one to the identification information into the target list.

For example, the current latest count in the target list of the FLASH is 1000, indicating that the quantity of all face images historically acquired by the camera component is 999. When the SENSOR acquires the 1000th face image, the DSP reads the current latest count 1000 from the target list of the FLASH and determines that the identification information is 1000. The identification information 1000 is embedded in the 1000th face image in the form of a blind watermark, and a value 1001 obtained by adding one to the identification information 1000 is then written back to the target list, so that the DSP can read 1001 when reading a current latest count next time, ensuring that the DSP can read an increasing count every time from the FLASH.

In some embodiments, the terminal may store the face image information in the memory of the camera component not in the form of a target list, but directly store the face image information in a target address, so that the storage space of the memory of the camera component can be saved.

In this case, the step 301 may be replaced by the following step: the terminal determines a value stored in the target address of the buffer as the face image information, that is, the terminal reads the target address in the memory of the camera component through the processor of the camera component, and determines the value stored in the target address as the face image information.

Based on the above, the step 305 may be replaced by the following step: the terminal sets the value stored in the target address as a value obtained by adding the identification information and a second target value, where the second target value is any value greater than or equal to 0. For example, the second target value is 1, and the second target value is the same as or different from the first target value. The value of the second target value or the first target value is not limited in this embodiment of this application.

In the foregoing process, the terminal does not need to maintain a costly target list in the memory of the camera component, but only stores the quantity of all face images that have been acquired in the target address, which can reduce the resource cost occupied by the memory. Therefore, the face image information stored in the target address can be updated in real time, and the processing efficiency of the camera component can be improved.

306. The terminal transmits the face image carrying the identification information.

In the foregoing process, the terminal may separately transmit the face image carrying the identification information, or may encapsulate the face image carrying the identification information together with other information into a service request to transmit the service request. The service request may correspond to different service types, such as an identity verification service and a value transfer service. Service types of the service request are not limited in this embodiment of this application.

In an exemplary scenario, the terminal may encapsulate a camera identification of the camera component and the face image carrying the identification information into an identity verification request to transmit the identity verification request to the server.

In an exemplary scenario, the terminal may alternatively encapsulate the camera identification of the camera component, the face image carrying the identification information, and value transfer information into a value transfer request to transmit the value transfer request to the server. The value transfer information includes at least a first user identification, a second user identification, and a to-be-transferred value.

Any combination of all the foregoing technical solutions may be used to form an embodiment of this application, and details are not described herein again.

In the method provided by this embodiment of this application, when a camera component acquires any face image, face image information can be read from a buffer. The face image information is used for indicating a quantity of all face images historically acquired by the camera component. Identification information is embedded in the face image to obtain the face image carrying the identification information. The identification information is used for indicating the face image information. The face image carrying the identification information is transmitted. Therefore, the identification information can be directly embedded in the face image acquired by the camera component, improving the security of the face image acquired by the camera component. Even if a face image is leaked, when an attacker steals a historical face image to request related services, the verification cannot be successful due to the discrepancy in the identification information, thereby effectively ensuring the security of the face image transmission process.

Figure 4:
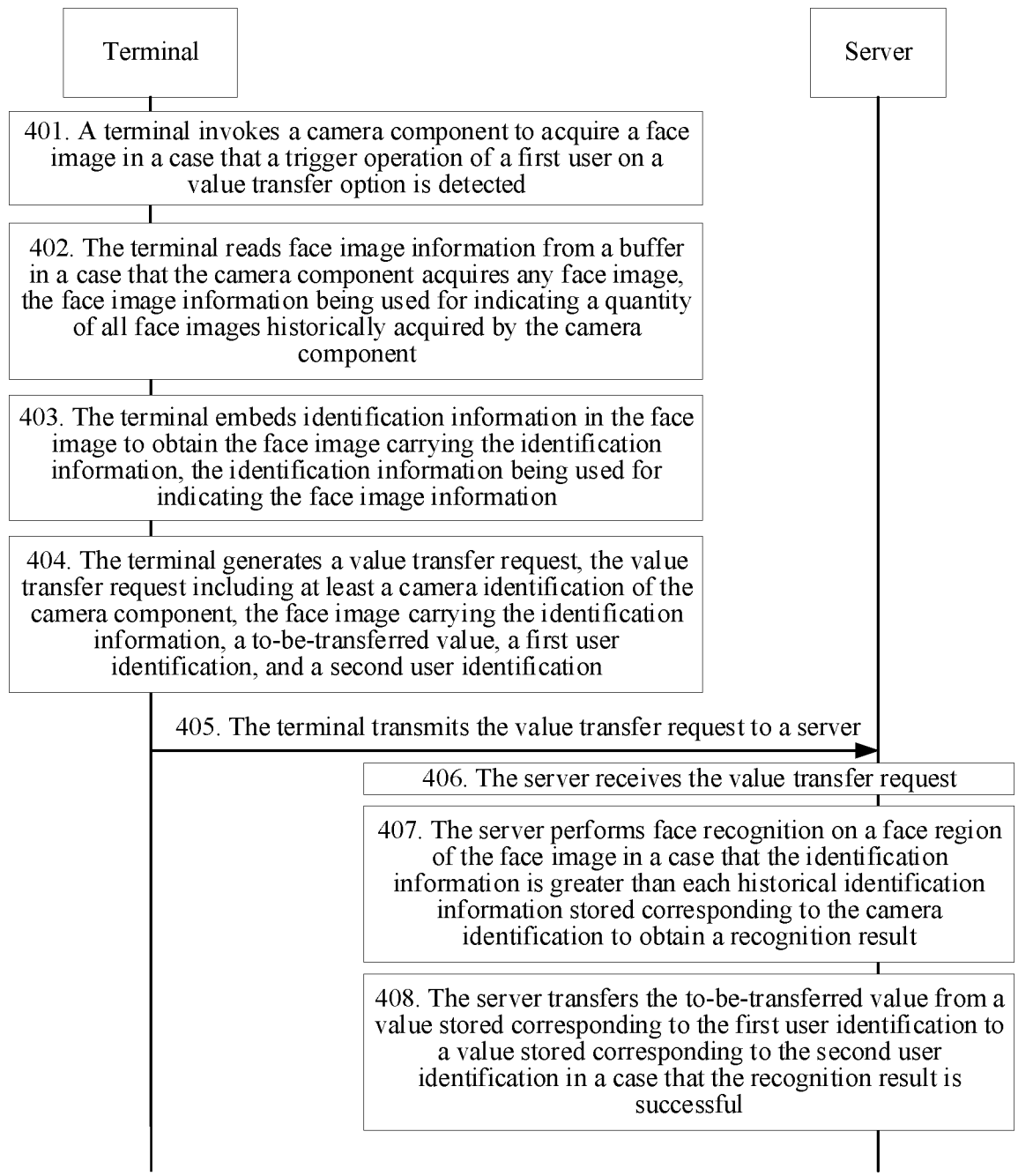
FIG. 4 is an interaction flowchart of a value transfer method according to an embodiment of this application.

The face image transmission method provided by the foregoing embodiment can ensure the security of the face data source acquired by the camera component. The unique identification of the acquisition timing of the face image based on the identification information can effectively ensure that the face image acquired each time can only be used once. Each user does not need to perform hardware upgrade or system transformation on the host of the terminal, and there is no mandatory requirement for the configuration of the host. Each user only needs to access the camera component provided by this embodiment of this application to ensure the security of the face data source, which greatly reduces the difficulty for maintaining the security of the face data source, and has high portability and usability. The face image transmission method may be applied to various service scenarios that rely on face images. In an embodiment of this application, the process of performing identity verification based on a face image to complete a value transfer service is used as an example. The process is referred to as a face payment scenario or a facial recognition payment scenario, which is described in detail below:

FIG. 4 is an interaction flowchart of a value transfer method according to an embodiment of this application. Referring to FIG. 4, this embodiment is applied to the interaction process between the terminal 120 and the server 140 in the foregoing implementation environment. This embodiment includes the following steps:

401. A terminal invokes a camera component to acquire a face image when a trigger operation of a first user on a value transfer option is detected.

In the foregoing process, the terminal may be a personal terminal of the first user, or may be a "facial recognition payment terminal" set in a store where a second user is located. The facial recognition payment terminal refers to an electronic device that integrates a camera and can acquire a face image of the user and then make a payment. Device types of the terminal are not limited in this embodiment of this application.

The first user and the second user are only distinguished names for users with different identities in a certain process of value transfer. In some value transfer processes, a certain user may be both a first user and a second user, that is, the user transfers a value from an account to another account both owned by himself/herself. Certainly, a certain user may be as a first user in a value transfer process and as a second user in another value transfer process.

In the step 401, when value transfer needs to be performed, the first user triggers the terminal to display a payment interface on a display screen. The payment interface may include value transfer information and a value transfer option. After the value transfer information is checked, the first user may perform a trigger operation on the value transfer option. When the trigger operation of the first user on the value transfer option is detected, a terminal operating system delivers an acquisition instruction to the camera component and invokes the camera component to acquire a face image of the first user.

In some embodiments, the value transfer information may include at least a first user identification, a second user identification, and a to-be-transferred value. Certainly, the value transfer information may further include transaction item information, discount information, transaction timestamp, and the like.

402. The terminal reads face image information from a buffer when the camera component acquires any face image, the face image information being used for indicating a quantity of all face images historically acquired by the camera component.

The step 402 is similar to the step 301, and details are not described herein again.

403. The terminal embeds identification information in the face image to obtain the face image carrying the identification information, the identification information being used for indicating the face image information.

The step 403 is similar to the steps 302 to 304. Details are not described herein again.

404. The terminal generates a value transfer request, the value transfer request including at least a camera identification of the camera component, the face image carrying the identification information, a to-be-transferred value, a first user identification, and a second user identification.

In the foregoing process, the terminal may compress the camera identification of the camera component, the face image carrying the identification information, the to-be-transferred value, the first user identification, and the second user identification by using a compression algorithm to obtain compressed information, encrypt the compressed information by using an encryption algorithm to obtain ciphertext information, and encapsulate the ciphertext information by using a transmission protocol to obtain the value transfer request.

In some embodiments, the compression algorithm may include at least one of a br compression algorithm, a gzip compression algorithm, or a Huffman compression algorithm, the encryption algorithm may include at least one of a symmetric encryption algorithm or an asymmetric encryption algorithm, such as a message digest algorithm and a Diffie-Hellman (DH) key exchange algorithm, and the transmission protocol may include at least one of an Internet Protocol (IP), a transmission control protocol (TCP), or a user datagram protocol (UDP). Types of the compression algorithm, the encryption algorithm, and the transmission protocol are not limited in this embodiment of this application.

405. The terminal transmits the value transfer request to a server.

After the terminal transmits the value transfer request, the server may perform identity verification based on the camera identification of the camera component and the face image carrying the identification information. The to-be-transferred value is transferred from a value stored corresponding to the first user identification to a value stored corresponding to the second user identification when the verification is successful. The implementation process is described in detail in the following steps 406 to 408.

406. The server receives the value transfer request.

The value transfer request includes at least a camera identification, a face image carrying identification information, a to-be-transferred value, a first user identification, and a second user identification, the identification information being used for indicating that the face image is an image acquired in real time.

In the foregoing process, after the value transfer request is received, the server may parse the value transfer request to obtain ciphertext information, decrypt the ciphertext information by using a decryption algorithm to obtain compressed information, and decompress the compressed information to obtain the camera identification, the face image carrying the identification information, the to-be-transferred value, the first user identification, and the second user identification. The decryption algorithm and decompression algorithm used herein respectively correspond to the encryption algorithm and compression algorithm in the step 404, and details are not described herein.

407. The server performs face recognition on a face region of the face image when the identification information is greater than each historical identification information stored corresponding to the camera identification to obtain a recognition result.

In the foregoing process, the server stores identification information of each face image corresponding to each camera identification. In some embodiments, the server may maintain an identification information sequence corresponding to each camera identification in a backend, and store each historical identification information of face images corresponding to the same camera identification in the same sequence, so that when any value transfer request carrying the camera identification is received, a face image carrying the identification information in the value transfer request is obtained, and the identification information is extracted from the face image. The server may query a maximum historical value in the identification information sequence corresponding to the camera identification. If the extracted identification information is greater than the maximum historical value, it is determined that the face image is valid, that is, the face image is not a stolen historical face image, and the server performs face recognition on a face region of the face image to obtain a recognition result. Otherwise, if the extracted identification information is less than or equal to the maximum historical value, it is determined that the face image is invalid, that is, the face image is a stolen historical face image, and the server may transmit verification failure information to the terminal.

In some embodiments, in the process of face recognition, the face image may be inputted to a face similarity model, and a similarity between the face image and a pre-stored image of a first user may be predicted by using the face similarity model. If the similarity is greater than or equal to a target threshold, it is determined that the recognition result of the face image is successful, and the following step 408 is performed. Otherwise, if the similarity is less than the target threshold, it is determined that the recognition result of the face image is not successful, and the server may transmit verification failure information to the terminal.

408. The server transfers the to-be-transferred value from a value stored corresponding to the first user identification to a value stored corresponding to the second user identification when the recognition result is successful.

In the foregoing process, if both the verification of the identification information and the verification of the face region are successful, the server performs the operation of transferring the to-be-transferred value from a value stored corresponding to the first user identification to a value stored corresponding to the second user identification, so that the first user completes the transfer of the to-be-transferred value to the second user. In the foregoing steps 404 to 408, the server performs value transfer based on the camera identification of the camera component and the face image carrying the identification information. In some embodiments, when the value transfer is completed, the server may further transmit transfer success information to the terminal to notify the terminal that the value transfer operation has been successfully performed.

Any combination of the foregoing technical solutions may be used to form an embodiment of this application. Details are not described herein again.

In the method provided by this embodiment of this application, when a trigger operation on a value transfer option is detected, a terminal invokes a camera component to acquire a face image. When the camera component acquires any face image, face image information is read from a buffer. The face image information is used for indicating a quantity of all face images historically acquired by the camera component. Identification information is embedded in the face image to obtain the face image carrying the identification information. The identification information is used for indicating the face image information. Value transfer is performed based on a camera identification of the camera component and the face image carrying the identification information. Therefore, in the process of value transfer, the identification information is directly embedded in the face image acquired by the camera component, improving the security of the face image acquired by the camera component. Even if a face image is leaked, when an attacker steals a historical face image to request a value transfer service, the verification cannot be successful due to the discrepancy in the identification information, thereby effectively ensuring the security of the value transfer process.

Further, the server receives a value transfer request. The value transfer request includes at least a camera identification, a face image carrying identification information, a to-be-transferred value, a first user identification, and a second user identification. The identification information is used for indicating that the face image is an image acquired in real time. When the identification information is greater than each historical identification information stored corresponding to the camera identification, face recognition is performed on a face region of the face image to obtain a recognition result. When the recognition result is successful, the to-be-transferred value is transferred from a value stored corresponding to the first user identification to a value stored corresponding to the second user identification. The server can determine whether the face image carrying the identification information is a stolen historical face image by comparing the identification information with each stored historical identification information, which obtains a way to verify the face image in a time dimension, and can deal with more complex network attacks. Even if a face image is leaked, when an attacker steals a historical face image to request a value transfer service, the verification cannot be successful due to the discrepancy in the identification information, thereby effectively ensuring the security of the value transfer process.

Figure 5:
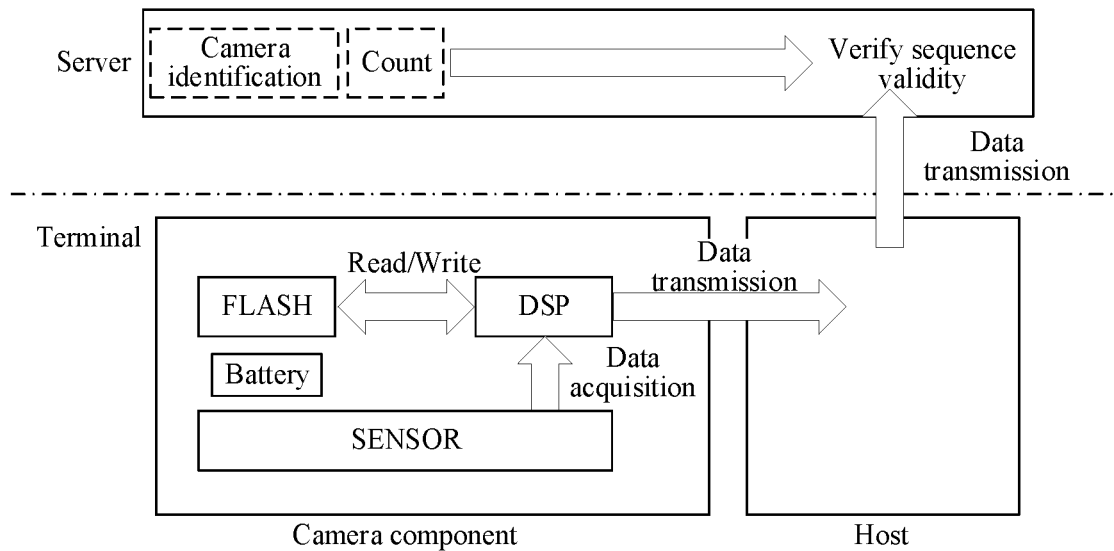
FIG. 5 is a schematic principle diagram of a value transfer method according to an embodiment of this application.

In an exemplary scenario, FIG. 5 is a schematic principle diagram of a value transfer method according to an embodiment of this application. Referring to FIG. 5, with the popularity of face payment, more and more merchants have access to face payment services. With the sudden increase in the quantity of users, the security of face payment becomes more and more important. In the value transfer method provided by this embodiment of this application, the internal improvement of a camera component of a facial recognition payment terminal can add a security precaution to the camera component that acquires a face data source without the need to perform hardware upgrade on the host side, which strictly ensures the security of the face data source and can effectively resist the "replay attack" of the face data. In some embodiments, the camera component of the terminal stores face image information in the FLASH, and after obtaining an acquired face data stream from the SENSOR, the DSP may read a face image count (that is, the face image information) from the FLASH and embed a blind watermark (that is, identification information) on each frame of face image in the face data stream. The blind watermark is used for indicating the face image count. The DSP transmits the face image carrying the blind watermark to the host. The host transmits the face image carrying the blind watermark to the server. The server stores an increasing sequence corresponding to a camera identification of the camera component in the backend. Each historical blind watermark (that is, a historical face image count) in the increasing sequence increases with time. Only when the blind watermark carried by the face image transmitted this time is greater than all the historical blind watermarks in the increasing sequence, it is considered that the face image transmitted this time is valid. Otherwise, it is considered that the face image transmitted this time is invalid. Therefore, the validity of the sequence is verified through the foregoing process, which ensures the security of the face image transmission process, and avoids the "replay attack" of the face image. Further, when it is determined that the face image transmitted this time is valid, the face recognition is performed on the face image, and when the recognition result of the face recognition is successful, the value transfer operation is performed, thereby ensuring the security of the value transfer process.

Figure 6:
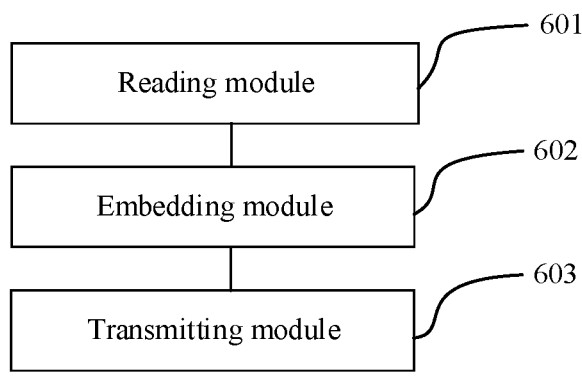
FIG. 6 is a schematic structural diagram of a face image transmission apparatus according to an embodiment of this application.

FIG. 6 is a schematic structural diagram of a face image transmission apparatus according to an embodiment of this application. Referring to FIG. 6, the apparatus includes:

a reading module 601, configured to read face image information from a buffer when a camera component acquires any face image, the face image information being used for indicating a quantity of all face images historically acquired by the camera component;

an embedding module 602, configured to embed identification information in the face image to obtain the face image carrying the identification information, the identification information being used for indicating the face image information; and a transmitting module 603, configured to transmit the face image carrying the identification information.

In the apparatus provided by this embodiment of this application, when a camera component acquires any face image, face image information can be read from a buffer. The face image information is used for indicating a quantity of all face images historically acquired by the camera component. Identification information is embedded in the face image to obtain the face image carrying the identification information. The identification information is used for indicating the face image information. The face image carrying the identification information is transmitted. Therefore, the identification information can be directly embedded in the face image acquired by the camera component, improving the security of the face image acquired by the camera component. Even if a face image is leaked, when an attacker steals a historical face image to request related services, the verification cannot be successful due to the discrepancy in the identification information, thereby effectively ensuring the security of the face image transmission process.

In some embodiments, the reading module 601 is configured to:
determine a maximum value in a target list of the buffer as the face image information, each value stored in the target list being corresponding to a quantity of face images.

In some embodiments, the apparatus is further configured to:
write a value obtained by adding the identification information and a first target value into the target list of the buffer.

In some embodiments, the reading module 601 is configured to:
determine a value stored in a target address of the buffer as the face image information.

In some embodiments, the apparatus is further configured to:
set the value stored in the target address as a value obtained by adding the identification information and a second target value.

In some embodiments, the identification information is a value obtained by adding the face image information and a third target value.

In some embodiments, the embedding module 602 is configured to:
embed the identification information in any region except a face region in the face image.

In some embodiments, the embedding module 602 is configured to:
perform Fourier transform on the face image to obtain a spectrum image of the face image;
embed the identification information in any region except a face region in the spectrum image; and
perform inverse Fourier transform on the spectrum image carrying the identification information to obtain the face image carrying the identification information.

Any combination of the foregoing technical solutions may be used to form an embodiment of this application. Details are not described herein again.

When the face image transmission apparatus provided in the foregoing embodiment transmits a face image, it is illustrated with an example of division of each functional module. In practical application, the function distribution may be implemented by different functional modules according to requirements, that is, an internal structure of an electronic device (for example, a terminal) is divided into different functional modules, to implement all or some of the functions described above. In addition, the face image transmission apparatus and the face image transmission method embodiments provided in the foregoing embodiments belong to the same conception. For the implementation process, reference may be made to the face image transmission method embodiment, and details are not described herein again.

Figure 7:
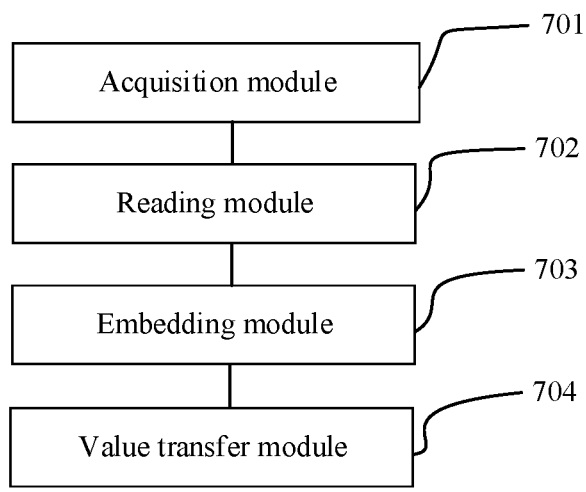
FIG. 7 is a schematic structural diagram of a value transfer apparatus according to an embodiment of this application.

FIG. 7 is a schematic structural diagram of a value transfer apparatus according to an embodiment of this application. Referring to FIG. 7, the apparatus includes:

an acquisition module 701, configured to invoke a camera component to acquire a face image when a trigger operation on a value transfer option is detected;

a reading module 702, configured to read face image information from a buffer when the camera component acquires any face image, the face image information being used for indicating a quantity of all face images historically acquired by the camera component;

an embedding module 703, configured to embed identification information in the face image to obtain the face image carrying the identification information, the identification information being used for indicating the face image information; and a value transfer module 704, configured to perform value transfer based on a camera identification of the camera component and the face image carrying the identification information.

In the apparatus provided by this embodiment of this application, when a trigger operation on a value transfer option is detected, a terminal invokes a camera component to acquire a face image. When the camera component acquires any face image, face image information is read from a buffer. The face image information is used for indicating a quantity of all face images historically acquired by the camera component. Identification information is embedded in the face image to obtain the face image carrying the identification information. The identification information is used for indicating the face image information. Value transfer is performed based on a camera identification of the camera component and the face image carrying the identification information. Therefore, in the process of value transfer, the identification information is directly embedded in the face image acquired by the camera component, improving the security of the face image acquired by the camera component. Even if a face image is leaked, when an attacker steals a historical face image to request a value transfer service, the verification cannot be successful due to the discrepancy in the identification information, thereby effectively ensuring the security of the value transfer process.

In some embodiments, the value transfer module 704 is configured to:
generate a value transfer request, the value transfer request including at least the camera identification of the camera component, the face image carrying the identification information, a to-be-transferred value, a first user identification, and a second user identification; and
transmit the value transfer request to a server, so that the server performs identity verification based on the camera identification of the camera component and the face image carrying the identification information, and transfer the to-be-transferred value from a value stored corresponding to the first user identification to a value stored corresponding to the second user identification when the verification is successful.

Any combination of the foregoing technical solutions may be used to form an embodiment of this application. Details are not described herein again.

When the value transfer apparatus transfers a value provided in the foregoing embodiment, it is illustrated with an example of division of each functional module. In the practical application, the function distribution may be finished by different functional modules according to the requirements, that is, the internal structure of an electronic device (for example, a terminal) is divided into different functional modules, to implement all or some of the functions described above. In addition, the value transfer apparatus and value transfer method embodiments provided in the foregoing embodiments belong to the same conception. For the implementation process, reference may be made to the value transfer method embodiment, and details are not described herein again.

Figure 8:
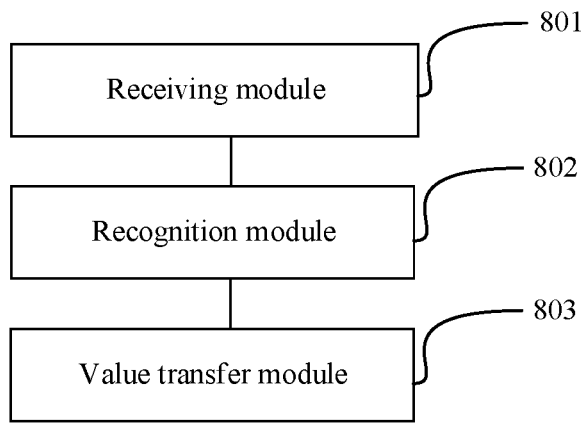
FIG. 8 is a schematic structural diagram of a value transfer apparatus according to an embodiment of this application.

FIG. 8 is a schematic structural diagram of a value transfer apparatus according to an embodiment of this application. Referring to FIG. 8, the apparatus includes:

a receiving module 801, configured to receive a value transfer request, the value transfer request including at least a camera identification, a face image carrying identification information, a to-be-transferred value, a first user identification, and a second user identification, the identification information being used for indicating that the face image is an image acquired in real time;

a recognition module 802, configured to perform face recognition on a face region of the face image when the identification information is greater than each historical identification information stored corresponding to the camera identification to obtain a recognition result; and a value transfer module 803, configured to transfer the to-be-transferred value from a value stored corresponding to the first user identification to a value stored corresponding to the second user identification when the recognition result is successful.

In the apparatus provided by this embodiment of this application, a value transfer request is received. The value transfer request includes at least a camera identification, a face image carrying identification information, a to-be-transferred value, a first user identification, and a second user identification. The identification information is used for indicating that the face image is an image acquired in real time. When the identification information is greater than each historical identification information stored corresponding to the camera identification, face recognition is performed on a face region of the face image to obtain a recognition result. When the recognition result is successful, the to-be-transferred value is transferred from a value stored corresponding to the first user identification to a value stored corresponding to the second user identification. Whether the face image carrying the identification information is a stolen historical face image can be determined by comparing the identification information with each stored historical identification information, which obtains a way to verify the face image in a time dimension, and can deal with more complex network attacks. Even if a face image is leaked, when an attacker steals a historical face image to request a value transfer service, the verification cannot be successful due to the discrepancy in the identification information, thereby effectively ensuring the security of the value transfer process.

When the value transfer apparatus transfers a value provided in the foregoing embodiment, it is illustrated with an example of division of each functional module. In the practical application, the function distribution may be finished by different functional modules according to the requirements, that is, the internal structure of an electronic device (for example, a server) is divided into different functional modules, to implement all or some of the functions described above. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. In addition, the value transfer apparatus and value transfer method embodiments provided in the foregoing embodiments belong to the same conception. For the implementation process, reference may be made to the value transfer method embodiment, and details are not described herein again.

Figure 9:
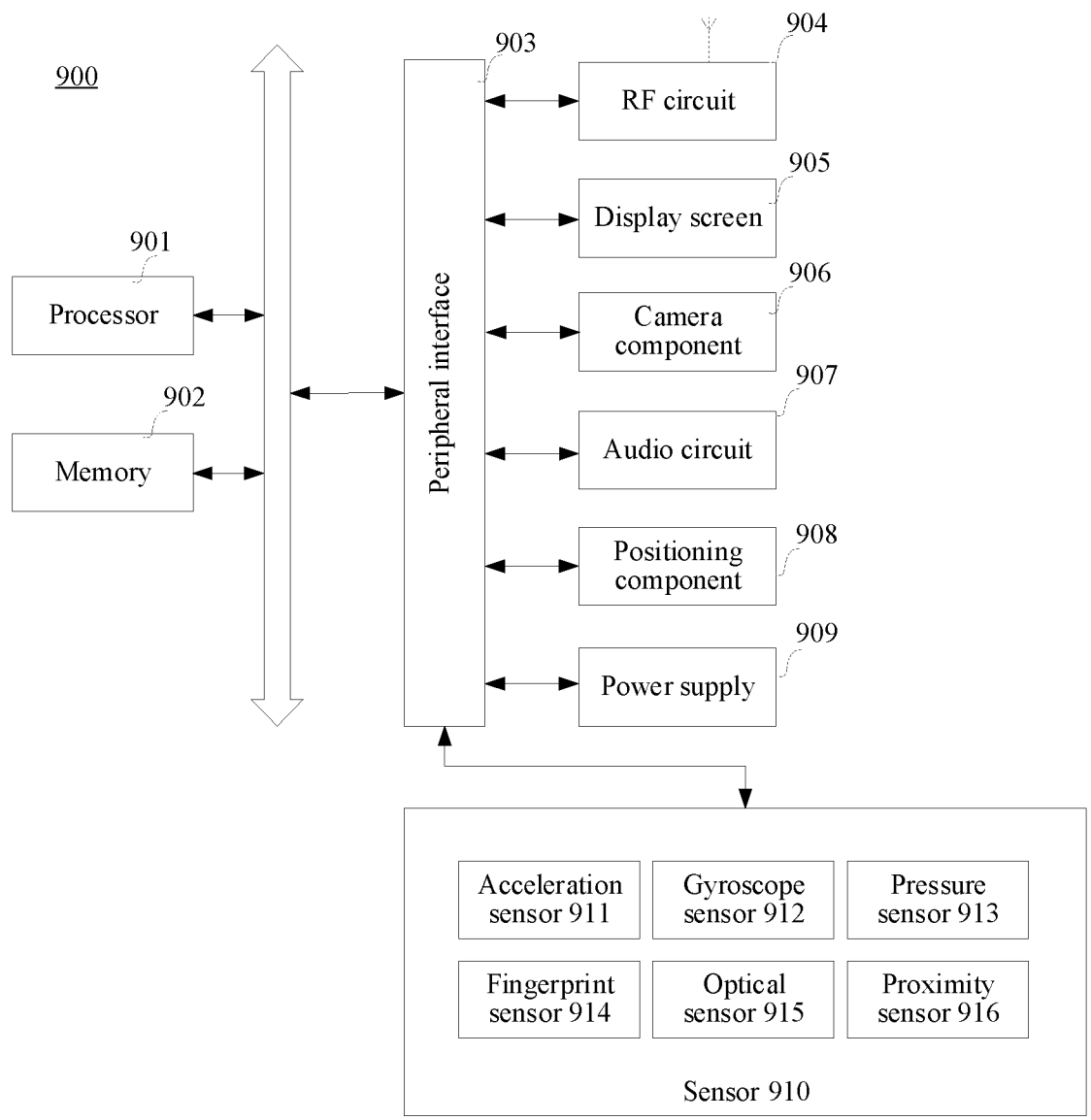
FIG. 9 is a structural block diagram of a terminal according to an embodiment of this application.

FIG. 9 is a structural block diagram of a terminal 900 according to an embodiment of this application. The terminal 900 is also an electronic device. The terminal 900 is a smartphone, a tablet computer, an MP3 player, an MP4 player, a notebook computer, or a desktop computer. The terminal 900 may also be referred to as a user equipment, a portable terminal, a laptop terminal, a desktop terminal, or the like.

Generally, the terminal 900 includes a processor 901 and a memory 902.

The processor 901 may include one or more processing cores, for example, a 4-core processor or an 8-core processor. The processor 901 may be implemented in at least one hardware form of DSP, FPGA, and PLA. The processor 901 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 901 is integrated with a graphics processing unit (GPU). The GPU is configured to be responsible for rendering and drawing content that a display needs to display. In some embodiments, the processor 901 includes an AI processor. The AI processor is configured to process a computing operation related to machine learning.

The memory 902 may include one or more computer-readable storage media that may be non-transitory. The memory 902 may further include a high-speed random access memory and a non-volatile memory, such as one or more magnetic disk storage devices or a flash storage device. In some embodiments, the non-transient computer-readable storage medium in the memory 902 is configured to store at least one instruction, and the at least one instruction is used to be executed by the processor 901 to implement the following operations:

reading face image information from a buffer when a camera component acquires any face image, the face image information being used for indicating a quantity of all face images historically acquired by the camera component;

embedding identification information in the face image to obtain the face image carrying the identification information, the identification information being used for indicating the face image information; and transmitting the face image carrying the identification information.

In some embodiments, the at least one instruction is used to be executed by the processor 901 to implement the following operations:

determining a maximum value in a target list of the buffer as the face image information, each value stored in the target list being corresponding to a quantity of face images.

In some embodiments, the at least one instruction is used to be executed by the processor 901 to implement the following operations:

writing a value obtained by adding the identification information and a first target value into the target list of the buffer.

In some embodiments, the at least one instruction is used to be executed by the processor 901 to implement the following operations:

determining a value stored in a target address of the buffer as the face image information.

In some embodiments, the at least one instruction is used to be executed by the processor 901 to implement the following operations:

setting the value stored in the target address as a value obtained by adding the identification information and a second target value.

In some embodiments, the identification information is a value obtained by adding the face image information and a third target value.

In some embodiments, the at least one instruction is used to be executed by the processor 901 to implement the following operations:

embedding the identification information in any region except a face region in the face image.

In some embodiments, the at least one instruction is used to be executed by the processor 901 to implement the following operations:

performing Fourier transform on the face image to obtain a spectrum image of the face image;

embedding the identification information in any region except a face region in the spectrum image; and performing inverse Fourier transform on the spectrum image carrying the identification information to obtain the face image carrying the identification information.

In some embodiments, the at least one instruction is used to be executed by the processor 901 to implement the following operations:

invoking a camera component to acquire a face image when a trigger operation on a value transfer option is detected;

reading face image information from a buffer when the camera component acquires any face image, the face image information being used for indicating a quantity of all face images historically acquired by the camera component;

embedding identification information in the face image to obtain the face image carrying the identification information, the identification information being used for indicating the face image information; and performing value transfer based on a camera identification of the camera component and the face image carrying the identification information.

In some embodiments, the at least one instruction is used to be executed by the processor 901 to implement the following operations:

generating a value transfer request, the value transfer request including at least the camera identification of the camera component, the face image carrying the identification information, a to-be-transferred value, a first user identification, and a second user identification; and transmitting the value transfer request to a server, so that the server performs identity verification based on the camera identification of the camera component and the face image carrying the identification information, and transferring the to-be-transferred value from a value stored corresponding to the first user identification to a value stored corresponding to the second user identification when the verification is successful.

In some embodiments, the terminal 900 may further include: a peripheral interface 903 and at least one peripheral. The processor 901, the memory 902, and the peripheral interface 903 may be connected by a bus or a signal cable. Each peripheral may be connected to the peripheral interface 903 by a bus, a signal cable, or a circuit board. In some embodiments, the peripheral includes: at least one of a radio frequency (RF) circuit 904, a touch display screen 905, a camera component 906, an audio circuit 907, a positioning component 908, and a power supply 909.

The peripheral interface 903 may be configured to connect the at least one peripheral related to Input/Output (I/O) to the processor 901 and the memory 902. In some embodiments, the processor 901, the memory 902, and the peripheral interface 903 are integrated on the same chip or circuit board. In some other embodiments, any one or two of the processor 901, the memory 902, and the peripheral interface 903 may be implemented on an independent chip or circuit board. This is not limited in this embodiment.

The RF circuit 904 is configured to receive and transmit an RF signal, which is also referred to as an electromagnetic signal. The RF circuit 904 communicates with a communication network and other communication devices through the electromagnetic signal. The RF circuit 904 converts an electrical signal into an electromagnetic signal for transmission, or converts a received electromagnetic signal into an electrical signal. In some embodiments, the RF circuit 904 includes: an antenna system, an RF transceiver, one or more amplifiers, a tuner, an oscillator, a digital signal processor, a codec chip set, a subscriber identity module card, and the like. The RF circuit 904 may communicate with another terminal through at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF circuit 904 may further include a circuit related to near field communication (NFC). This is not limited in this application.

The display screen 905 is configured to display a user interface (UI). The UI may include a graph, a text, an icon, a video, and any combination thereof. When the display screen 905 is a touch display screen, the display screen 905 is further capable of collecting touch signals on or above a surface of the display screen 905. The touch signal may be inputted to the processor 901 for processing as a control signal. In this case, the display screen 905 may be further configured to provide a virtual button and/or a virtual keyboard that are/is also referred to as a soft button and/or a soft keyboard. In some embodiments, there is one display screen 905 disposed on a front panel of the terminal 900. In some other embodiments, there are at least two display screens 905 respectively disposed on different surfaces of the terminal 900 or designed in a foldable shape. In still some other embodiments, the display screen 905 is a flexible display screen, disposed on a curved surface or a folded surface of the terminal 900. Even, the display screen 905 may be further set to have a non-rectangular irregular pattern, that is, a special-shaped screen. The display screen 905 may be prepared by using materials such as a liquid crystal display (LCD), an organic light-emitting diode (OLED), or the like.

The camera component 906 is configured to acquire images or videos. In some embodiments, the camera component 906 includes a front-facing camera and a rear-facing camera. Generally, the front-facing camera is disposed on a front panel of the terminal, and the rear-facing camera is disposed on a rear surface of the terminal. In some embodiments, there are at least two rear-facing cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 906 further includes a flash. The flash may be a single color temperature flash or a double color temperature flash. The double color temperature flash is a combination of a warm light flash and a cold light flash, and may be used for light compensation under different color temperatures.

The audio circuit 907 includes a microphone and a speaker. The microphone is configured to collect sound waves of users and surroundings, and convert the sound waves into electrical signals and input the signals to the processor 901 for processing, or input the signals to the RF circuit 904 to implement voice communication. For the purpose of stereo acquisition or noise reduction, there may be a plurality of microphones, disposed at different parts of the terminal 900 respectively. The microphone is an array microphone or an omni-directional acquisition microphone. The speaker is configured to convert electrical signals from the processor 901 or the RF circuit 904 into sound waves. The speaker may be a conventional thin-film speaker, or may be a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 907 may also include an earphone jack.

The positioning component 908 is configured to determine a current geographic location of the terminal 900, to implement navigation or a location based service (LBS). The positioning component 908 may be a positioning component based on the Global Positioning System (GPS) of the United States, the BeiDou system of China, the GLONASS System of Russia, or the GALILEO System of the European Union.

The power supply 909 is configured to supply power to components in the terminal 900. The power supply 909 may be an alternating-current power supply, a direct-current power supply, a disposable battery, or a rechargeable battery. When the power supply 909 includes the rechargeable battery, the rechargeable battery may support wired charging or wireless charging. The rechargeable battery may further be configured to support a quick charge technology.

In some embodiments, the terminal 900 further includes one or more sensors 910. The one or more sensors 910 include, but are not limited to, an acceleration sensor 911, a gyroscope sensor 912, a pressure sensor 913, a fingerprint sensor 914, an optical sensor 915, and a proximity sensor 916.

The acceleration sensor 911 may detect the magnitude of acceleration on three coordinate axes of a coordinate system established by the terminal 900. For example, the acceleration sensor 911 may be configured to detect components of the gravity acceleration on the three coordinate axes. The processor 901 may control, according to a gravity acceleration signal collected by the acceleration sensor 911, the touch display screen 905 to display the UI in a landscape view or a portrait view. The acceleration sensor 911 may be further configured to acquire motion data of a game or a user.

The gyroscope sensor 912 may detect a body direction and a rotation angle of the terminal 900, and may work with the acceleration sensor 911 to acquire a 3D action performed by the user on the terminal 900. The processor 901 may implement the following functions according to data collected by the gyroscope sensor 912: motion sensing (for example, the UI is changed according to a tilt operation of the user), image stabilization during shooting, game control, and inertial navigation.

The pressure sensor 913 may be disposed on a side frame of the terminal 900 and/or a lower layer of the touch display screen 905. When the pressure sensor 913 is disposed on the side frame of the terminal 900, a holding signal of the user to the terminal 900 may be detected, and left/right hand identification or a quick action may be performed by the processor 901 according to the holding signal acquired by the pressure sensor 913. When the pressure sensor 913 is disposed on the lower layer of the touch display screen 905, the processor 901 controls, according to a pressure operation of the user on the touch display screen 905, an operable control on the UI. The operable control includes at least one of a button control, a scroll-bar control, an icon control, and a menu control.

The fingerprint sensor 914 is configured to collect a fingerprint of the user, and the processor 901 recognizes an identity of the user according to the fingerprint collected by the fingerprint sensor 914, or the fingerprint sensor 914 recognizes the identity of the user according to the collected fingerprint. When the identity of the user is recognized as credible, the processor 901 authorizes the user to perform a related sensitive operation. The sensitive operation includes unlocking a screen, viewing encrypted information, downloading software, paying, changing a setting, and the like. The fingerprint sensor 914 may be disposed on a front surface, a back surface, or a side surface of the terminal 900. When a physical button or a vendor logo is disposed on the terminal 900, the fingerprint sensor 914 may be integrated with the physical button or the vendor logo.

The optical sensor 915 is configured to acquire ambient light intensity. In an embodiment, the processor 901 may control display brightness of the touch display screen 905 according to the ambient light intensity acquired by the optical sensor 915. In some embodiments, when the ambient light intensity is relatively high, the display brightness of the touch display screen 905 is increased; and when the ambient light intensity is relatively low, the display brightness of the touch display screen 905 is reduced. In another embodiment, the processor 901 may further dynamically adjust a camera parameter of the camera component 906 according to the ambient light intensity acquired by the optical sensor 915.

The proximity sensor 916, also referred to as a distance sensor, is generally disposed on the front panel of the terminal 900. The proximity sensor 916 is configured to collect a distance between the user and the front face of the terminal 900. In an embodiment, when the proximity sensor 916 detects that the distance between the user and the front surface of the terminal 900 gradually becomes smaller, the touch display screen 905 is controlled by the processor 901 to switch from a screen-on state to a screen-off state; and when the proximity sensor 916 detects that the distance between the user and the front surface of the terminal 900 gradually becomes larger, the touch display screen 905 is controlled by the processor 901 to switch from the screen-off state to the screen-on state.

A person skilled in the art can understand that the structure shown in FIG. 9 does not constitute a limitation to the terminal 900, and the terminal may include more or fewer components than those shown in the figure, or some components may be combined, or a different component arrangement may be used.

Figure 10:
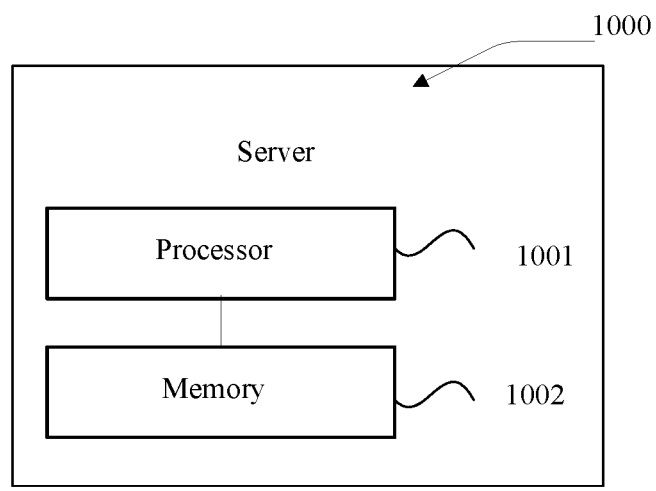
FIG. 10 is a schematic structural diagram of a server according to an embodiment of this application.

FIG. 10 is a schematic structural diagram of a server according to an embodiment of this application. A server 1000 is also an electronic device. The server 1000 may vary greatly because a configuration or performance varies, and may include one or more processors (CPU) 1001 and one or more memories 1002. The memory 1002 stores at least one program code, and the at least one program code is loaded and executed by the processor 1001 to implement the following operations:

receiving a value transfer request, the value transfer request including at least a camera identification, a face image carrying identification information, a to-be-transferred value, a first user identification, and a second user identification, the identification information being used for indicating that the face image is an image acquired in real time;

performing face recognition on a face region of the face image when the identification information is greater than each historical identification information stored corresponding to the camera identification to obtain a recognition result; and transferring the to-be-transferred value from a value stored corresponding to the first user identification to a value stored corresponding to the second user identification when the recognition result is successful.

In the value transfer method provided by the foregoing embodiments, certainly, the server 1000 may also have a wired or wireless network interface, a keyboard, an input/output interface and other components to facilitate input/output. The server 1000 may also include other components for implementing device functions. Details are not described herein.

In an exemplary embodiment, a computer-readable storage medium, for example, a memory including at least one program code is further provided. The at least one program code may be executed by a processor in a terminal to implement the following operations:

reading face image information from a buffer when a camera component acquires any face image, the face image information being used for indicating a quantity of all face images historically acquired by the camera component;

embedding identification information in the face image to obtain the face image carrying the identification information, the identification information being used for indicating the face image information; and transmitting the face image carrying the identification information.

In some embodiments, the at least one program code may be executed by a processor in a terminal to implement the following operations:

determining a maximum value in a target list of the buffer as the face image information, each value stored in the target list being corresponding to a quantity of face images.

In some embodiments, the at least one program code may be executed by a processor in a terminal to implement the following operations:

writing a value obtained by adding the identification information and a first target value into the target list of the buffer.

In some embodiments, the at least one program code may be executed by a processor in a terminal to implement the following operations:

determining a value stored in a target address of the buffer as the face image information.

In some embodiments, the at least one program code may be executed by a processor in a terminal to implement the following operations:

setting the value stored in the target address as a value obtained by adding the identification information and a second target value.

In some embodiments, the identification information is a value obtained by adding the face image information and a third target value.

In some embodiments, the at least one program code may be executed by a processor in a terminal to implement the following operations:

embedding the identification information in any region except a face region in the face image.

In some embodiments, the at least one program code may be executed by a processor in a terminal to implement the following operations:

performing Fourier transform on the face image to obtain a spectrum image of the face image;

embedding the identification information in any region except a face region in the spectrum image; and performing inverse Fourier transform on the spectrum image carrying the identification information to obtain the face image carrying the identification information.

For example, the computer-readable storage medium is a read-only memory (ROM), a random-access memory (RAM), a compact disc read-only memory (CD-ROM), a magnetic tape, a floppy disk, an optical data storage device, or the like.

In some embodiments, a computer program or computer program product including at least one program code is further provided, the computer program or computer program product, when run on a computer device, causing the computer device to perform any possible implementation in the face image transmission method or the value transfer method provided in the foregoing embodiments. Details are not described herein.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are embodiments of this application, but are not intended to limit this application. Any modification, equivalent replacement, or improvement made within the spirit and principle of this application shall fall within the protection scope of this application.

What is claimed is:

1. A face image transmission method performed by a processor of a camera component, the method comprising:
   reading a target list from a buffer of a memory of the camera component for a face image acquired by the camera component, wherein:
      a plurality of values are stored in the target list,
      each of the plurality of values corresponds to a respective quantity of face images,
      a maximum value in the target list is updated as a quantity of all face images the camera component has ever acquired since being first activated increases;
   determining the maximum value in the target list as face image information, wherein the face image information is used for indicating the quantity of all face images the camera component has ever acquired since being first activated;
   embedding identification information in the face image to obtain the face image carrying the identification information, the identification information being used for indicating the face image information and the identification information in the face image not being perceivable by a human being; and
   transmitting the face image carrying the identification information to a remote server for authenticating the face image using the identification information.

2. The method according to claim 1, wherein after the embedding identification information in the face image to obtain the face image carrying the identification information, the method further comprises:
   writing a value obtained by adding the identification information and a first target value into the target list of the buffer.

3. The method according to claim 1, wherein the method further comprises:
   determining a value stored in a target address of the buffer as the face image information.

4. The method according to claim 3, wherein after the embedding identification information in the face image to obtain the face image carrying the identification information, the method further comprises:
   setting the value stored in the target address as a value obtained by adding the identification information and a second target value.

5. The method according to claim 1, wherein the identification information is a value obtained by adding the face image information and a third target value.

6. The method according to claim 1, wherein the embedding identification information in the face image comprises:
   embedding the identification information in any region except a face region in the face image.

7. The method according to claim 1, wherein the embedding identification information in the face image to obtain the face image carrying the identification information comprises:
   performing Fourier transform on the face image to obtain a spectrum image of the face image;
   embedding the identification information in the spectrum image; and
   performing inverse Fourier transform on the spectrum image carrying the identification information to obtain the face image carrying the identification information.

8. An electronic device, comprising a camera component including one or more processors and one or more memories, the one or more memories storing at least one program code, the at least one program code being loaded and executed by the one or more processors to implement a plurality of operations comprising:
   reading a target list from a buffer of the one or more memories for a face image acquired by the camera component, wherein:
      a plurality of values are stored in the target list,
      each of the plurality of values corresponds to a respective quantity of face images,
      a maximum value in the target list is updated as a quantity of all face images the camera component has ever acquired since being first activated increases;
   determining the maximum value in the target list as face image information, wherein the face image information is used for indicating the quantity of all face images the camera component has ever acquired since being first activated;
   embedding identification information in the face image to obtain the face image carrying the identification information, the identification information being used for indicating the face image information and the identification information in the face image not being perceivable by a human being; and
   transmitting the face image carrying the identification information to a remote server for authenticating the face image using the identification information.

9. The electronic device according to claim 8, wherein the plurality of operations further comprise:
   after embedding identification information in the face image to obtain the face image carrying the identification information, writing a value obtained by adding the identification information and a first target value into the target list of the buffer.

10. The electronic device according to claim 8, wherein the plurality of operations further comprise:
    determining a value stored in a target address of the buffer as the face image information.

11. The electronic device according to claim 10, wherein the plurality of operations further comprise:
    after embedding identification information in the face image to obtain the face image carrying the identification information, setting the value stored in the target address as a value obtained by adding the identification information and a second target value.

12. The electronic device according to claim 8, wherein the identification information is a value obtained by adding the face image information and a third target value.

13. The electronic device according to claim 8, wherein the embedding identification information in the face image comprises:
    embedding the identification information in any region except a face region in the face image.

14. The electronic device according to claim 8, wherein the embedding identification information in the face image to obtain the face image carrying the identification information comprises:
    performing Fourier transform on the face image to obtain a spectrum image of the face image;
    embedding the identification information in the spectrum image; and
    performing inverse Fourier transform on the spectrum image carrying the identification information to obtain the face image carrying the identification information.

15. A non-transitory computer-readable storage medium, storing at least one program code, the at least one program code being loaded and executed by a processor of an electronic device comprising a camera component to implement a plurality of operations comprising:
- reading a target list from a buffer of a memory of the camera component for a face image acquired by the camera component, wherein:
  - a plurality of values are stored in the target list,
  - each of the plurality of values corresponds to a respective quantity of face images,
  - a maximum value in the target list is updated as a quantity of all face images the camera component has ever acquired since being first activated increases;
- determining the maximum value in the target list as face image information, wherein the face image information is used for indicating the quantity of all face images the camera component has ever acquired since being first activated;
- embedding identification information in the face image to obtain the face image carrying the identification information, the identification information being used for indicating the face image information and the identification information in the face image not being perceivable by a human being; and
- transmitting the face image carrying the identification information to a remote server for authenticating the face image using the identification information.

16. The non-transitory computer-readable storage medium according to claim 15, wherein the plurality of operations further comprise:
- after embedding identification information in the face image to obtain the face image carrying the identification information, writing a value obtained by adding the identification information and a first target value into the target list of the buffer.

17. The non-transitory computer-readable storage medium according to claim 15, wherein the plurality of operations further comprise:
- determining a value stored in a target address of the buffer as the face image information.

* * * * *